United States Patent [19]

Schoch et al.

[11] Patent Number: 4,578,318

[45] Date of Patent: Mar. 25, 1986

[54] SHEET METAL ORNAMENTS HAVING A LACY APPEARANCE AND PROCESS FOR MAKING THEM

[75] Inventors: Donald C. Schoch, Sandy Hook, Conn.; Albert C. Engelmann, Esmond, R.I.

[73] Assignee: Tamerlane Corporation, Esmond, R.I.

[21] Appl. No.: 661,725

[22] Filed: Oct. 17, 1984

[51] Int. Cl.[4] .......................... B32B 3/10; B44C 1/22; B44F 7/00

[52] U.S. Cl. .................................. 428/615; 156/661.1; 156/666; 428/134; 428/542.2; 430/295; 430/323; 430/324

[58] Field of Search ......................... 428/7, 134, 542.2; 40/124.1; D28/43; 156/61, 661.1, 666; 430/295, 323, 324

[56] References Cited

U.S. PATENT DOCUMENTS

| | | | |
|---|---|---|---|
| D. 160,717 | 10/1950 | Kipnis | D28/43 X |
| D. 160,718 | 10/1950 | Kipnis | D28/43 X |
| 1,737,333 | 11/1929 | Rivelis | 428/137 X |
| 2,536,383 | 1/1951 | Mears et al. | 156/661.1 X |
| 2,688,582 | 9/1954 | Phair et al. | 428/134 X |
| 2,731,333 | 1/1956 | Ko et al. | 156/661.1 X |
| 3,089,800 | 5/1963 | Colfer et al. | 428/134 X |
| 3,506,441 | 4/1970 | Gottfried | 156/661.1 X |
| 3,847,717 | 11/1974 | Kass | 428/136 |
| 4,321,105 | 3/1982 | Melonio et al. | 430/329 X |
| 4,380,128 | 4/1983 | Ichikawa | 40/124.1 X |

*Primary Examiner*—Henry F. Epstein

[57] ABSTRACT

Intricate lightweight metal ornaments having an aesthetically pleasing laciness. Such ornaments are produced in a sequence of metal forming and coating steps utilizing an etching process to permit an almost infinite variety of designs to be produced without the use of dies or molds. A defined sequence of etches and partial etches of prescribed depths and dimensions into opposite sides of a metal sheet, typically brass, first produces a metal form of intricate edge and surface patterns that have qualities resembling the fine needlework of lace. To complete the decorative impression, the etched form is subsequently coated with a thin, adherent but flexible decorative layer that enhances the impression of laciness. The resulting ornament is intricate, pretty, easy to care for, durable, and can be bent without loss of the adherence of the coating.

15 Claims, 10 Drawing Figures

SHEET METAL ORNAMENTS HAVING A LACY APPEARANCE AND PROCESS FOR MAKING THEM

FIELD OF THE INVENTION

This invention pertains to metal ornaments, and more particularly to sheet metal ornaments having a lacy appearance, and the process by which such ornaments are prepared.

BACKGROUND OF THE INVENTION

Ornaments exist in a great variety of designs, shapes, sizes, and construction materials. They can be flat or three-dimensional. They can be made from nearly any material, including paper, glass, plastic, wood, fabric, and metal. Depending upon the fabrication material, they can convey different aesthetic impressions.

A desired aesthetic impression may be achievable only in certain materials and deficiencies may be associated with those materials, such as combustibility, fragility, sensitivity to heat and humidity, and difficulty of cleaning or repair. Metal ornaments suffer least from most of these disadvantages, but tend not to lend themselves to impart subtle aesthetic impressions such as laciness, because they are frequently produced by stamping and casting processes which yield crude or heavy-looking products. Also, such processes often limit the variety of possible designs, due to the expense of dies or molds necessary in their construction or manufacture.

Metal ornaments offer the advantages of being nonflammable, durable, tolerant of heat and humidity, and easy to clean. Accordingly, intricate light weight metal ornaments made by a process which imparts a nonmetallic lacy aesthetic quality in a variety of designs are very desirable.

SUMMARY OF THE INVENTION

In accordance with the teaching of the present invention, intricately apertured and recessed sheet metal ornaments conveying a fine lacy impression are produced in an etching and coating process. Structural and design elements of such ornaments are defined by intricate patterns of recesses and apertures in and through sheet metal, including patterns of apertures wherein recessed areas. Ornaments are produced by an etching process in which photoresist on both sides of a metal sheet is exposed through appropriately aligned complementary photomasks to produce complementary patterns of unexposed areas which define recesses in areas unexposed on only one side of the metal sheet, and apertures through the metal sheet in areas where the photoresist was unexposed on both sides of the sheet. After development of the photoresist, the unprotected areas of the metal sheet are etched from both sides to an extent sufficient to create recesses and apertures. Delicacy of appearance of the ornaments is achieved by making recesses and apertures generally substantially wider than adjacent nonrecessed and nonapertured solid parts of the ornaments. Finally, the ornaments are preferably coated with an elastomer-containing paint or plated with a metal such as gold to enhance a decorative laciness.

BRIEF DESCRIPTION OF THE DRAWINGS

These and other features of the subject invention will be better understood in connection with the solely exemplary detailed description taken in conjunction with the drawing in which.

DETAILED DESCRIPTION OF THE INVENTION

The present invention comtemplates sheet metal based ornaments having fine lacy aesthetics. The structural and design elements are defined by an intricate needlework-like pattern formed by a combination of apertures running through the sheet metal, and by recessed areas on the front, or viewing, surface.

Figure 1:
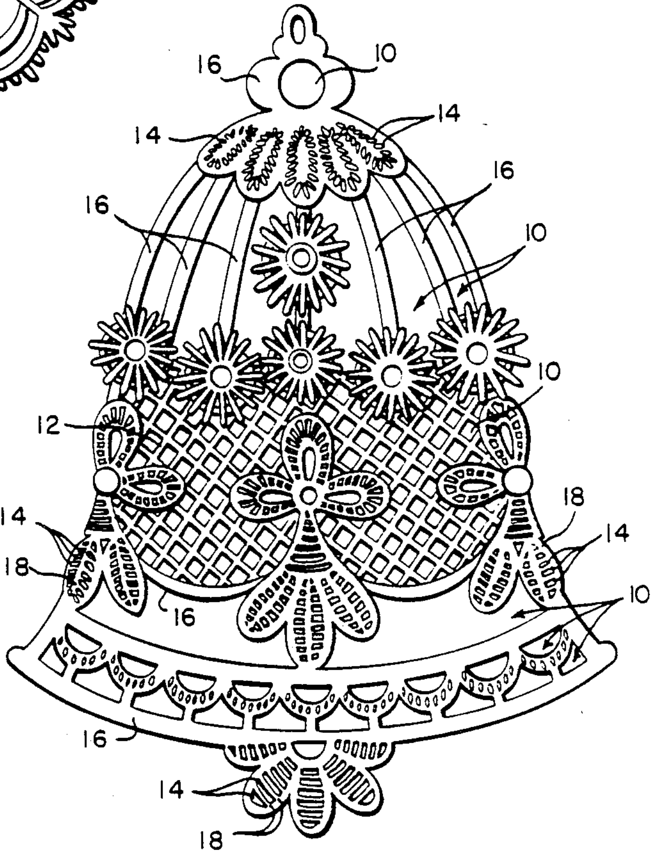
FIG. 1 is an enlarged plan view of a first ornament of the invention, showing apertures, recessed areas, and apertures in recessed areas, defining structural and design elements.

FIG. 1 illustrates an ornament of the invention, showing apertures 10, broadly recessed latticework areas 12 in which the latticework constitutes a minor structural/design element, trough-like recesses 14, major design/structural elements 16, and secondary design elements consisting of unrecessed strips 18 between trough-like recesses. Design/structural elements 16 and 18 are defined by the many intricate combinations of apertures and recesses.

Figure 2:
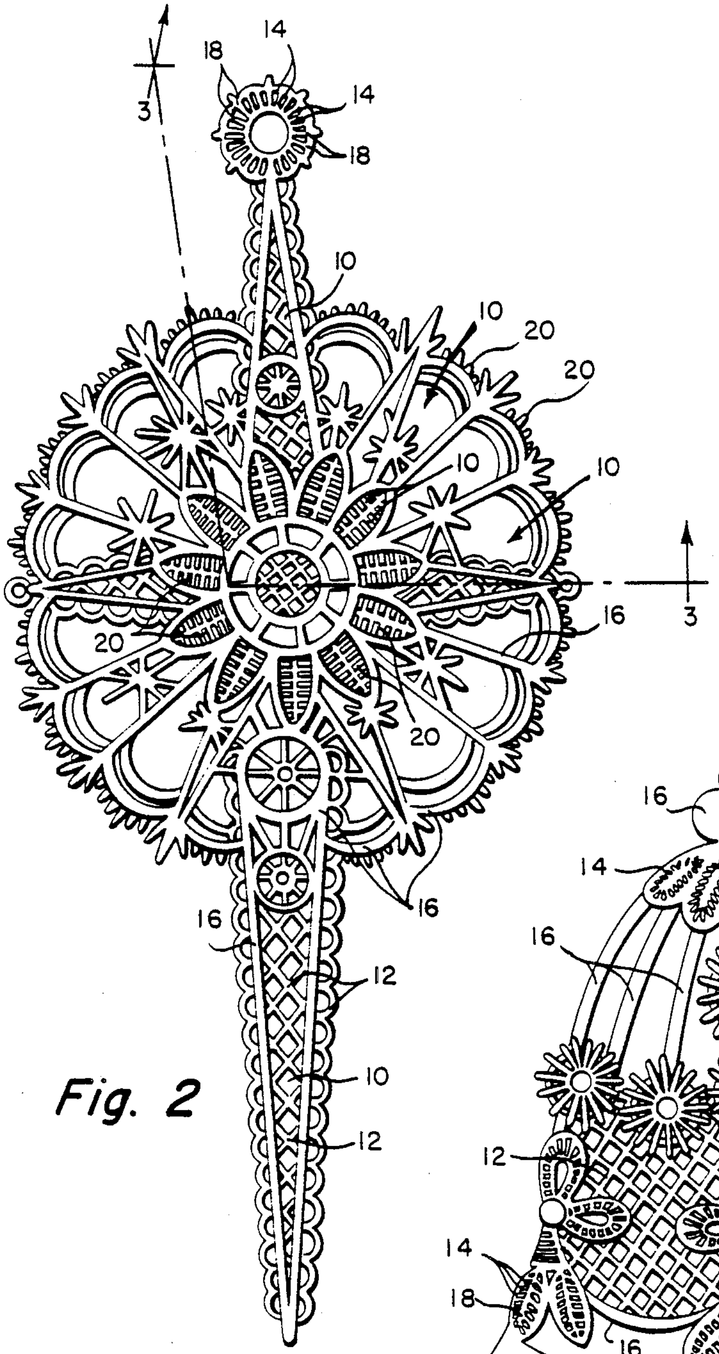
FIG. 2 is an enlarged plan view of a second ornament of the invention, particularly illustrating fine filaments of partially etched material projecting from structural or design elements into apertures or surrounding space.

FIG. 2 illustrates a second ornament of the invention, again showing the above-mentioned elements, and particularly illustrating the aesthetic effect produced by fine metal filaments 20 projecting from structural/-design elements 16 into apertured areas or open space surrounding the ornament.

Figure 3:
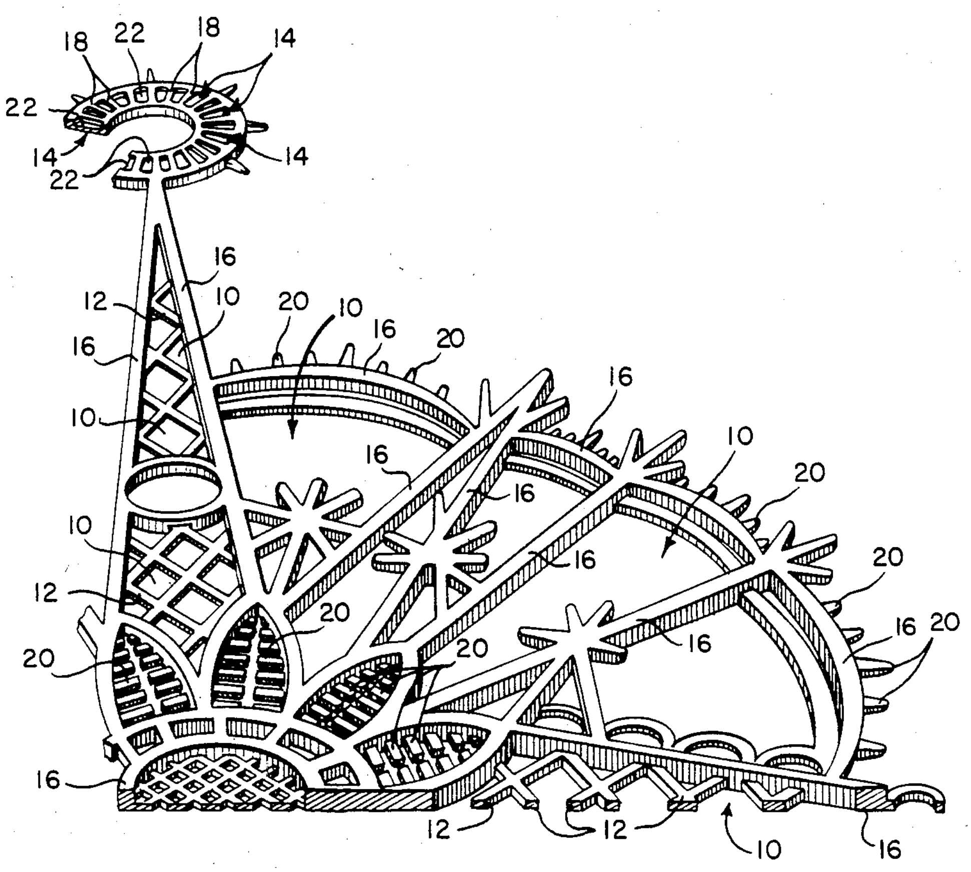
FIG. 3 is an enlarged perspective view of parts of an ornament, showing the various features of ornaments of the invention.
Figure 4:
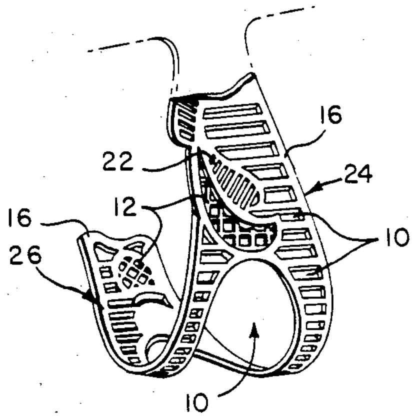
FIG. 4 is a portion of a bent ornament of the invention.

FIG. 3 shows a perspective view of a part of an ornament according to the invention, showing apertures 10, broadly recessed latticework areas 12, trough-like recesses 14 exposing metal faces 22 at a predetermined depth in the sheet, major design/structural elements 16, unrecessed strips 18, and fine metal filaments 20. Major structural elements 16 exhibit greater width than other ornament parts for purposes of strength. Many of the troughs 14 are arranged adjacent to one another separated by unrecessed strips 18 that give the appearance of strands of stitching or needlework.

For delicacy of appearance, recessed areas 12 and 14, and apertures 10 are generally substantially wider than adjacent solid areas and are usually at least twice as wide as such solid areas. Such may not be the invariable rule, however, since actual proportions are a function of the particular designs employed. Structural and design elements 16 and 18 are solid areas between apertures or recesses and are at least as wide as the thickness of the metal at those points, as shown in FIG. 3.

The recesses produce on the front or viewing surface of the ornament a sculptural relief effect, shown in FIGS. 1 and 2, while the combination of apertures and recesses creates the impression of needlework in lace. A thin coating of an elastomer-containing paint or metal plating may cover the ornament without filling in or obscuring fine detail to enhance the appearance of lace. A white paint or gold plate layer are particularly attractive. The coating adheres to the piece without cracking or chipping if the ornament is flexed or bent.

Ornaments according to the invention may be exhibited flat as shown in FIGS. 1–3, with the surface recesses producing a sculptural relief effect. Additionally the ornaments may be bent or folded to create a more three-dimensional structure. Three-dimensional ornaments formed by bending or folding define outer primary viewing surfaces 24 and inner, nonviewing, secondary surfaces 26. Those parts of the sheet metal which will ultimately constitute the primary surface of the ornament carry most of the recessed areas, for visual effect. The inner or nonviewing secondary surfaces 26 are recessed along the intended lines of folding, to facilitate folding where relatively sharp angles are desired.

In folded three-dimensional ornaments the primary and secondary surfaces are defined by the structure of the ornament, and do not necessarily correspond to the first and second sides of the flat sheet metal from which the ornament is made. Thus, depending on how the ornament is folded, the primary and secondary surfaces may both derive from one side of the original flat metal sheet, they may derive from opposite sides of the original flat sheet, or both may derive from both sides of the original sheet of metal.

Thus where the ornament is bent or folded in its intended use, the portions of the back side which come into view upon folding are given a pattern or recesses and apertures for the desired lacy effect.

Ornaments according to the invention are prepared by an etching process illustrated in FIGS. 5A–5F.

Figure 5A:
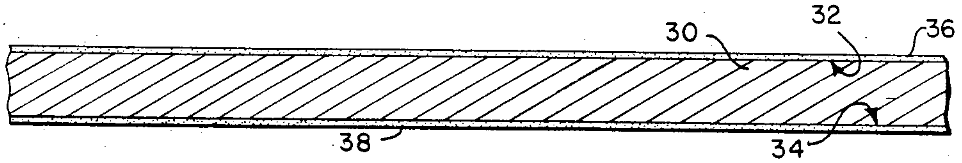
FIG. 5A is a cross-sectional view of a metal sheet coated on both sides with a layer of photoresist.
Figure 5B:
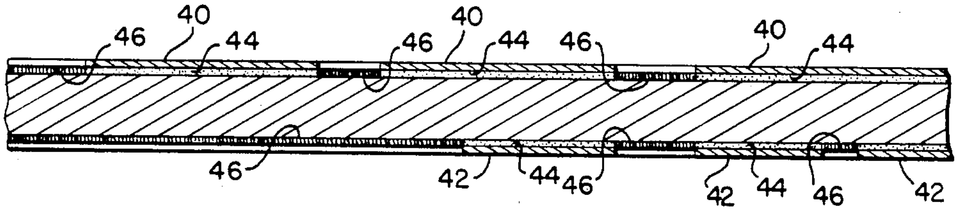
FIG. 5B is a cross-sectional view of the coated sheet metal of FIG. 5A, after exposure of both sides through photomasks.

As illustrated in FIG. 5A a sheet 30, typically of brass, is coated on top and bottom sides 32 and 34 respectively with top and bottom layers of photoresist 36 and 38. Masks 40 and 42 are placed upon the layers 36 and 38 respectively and the layers are then exposed to light in a subsequent step to yield unexposed portions 44 and exposed portions 46 in the top and bottom layers 36 and 38 in registration with the masks 40 and 42. The unexposed portions 44 as shown in FIG. 5B on top side 32 in some cases face exposed portions 46 on the opposite side, and in other cases face unexposed portions on the opposite side. These complementary patterns of the unexposed and exposed portions define regions to receive recesses in the first mentioned cases and define regions to be apertured in the second mentioned cases. The complimentary patterns define apertures adjoining both recessed and unrecessed regions.

By virtue of the etching process to be described below, recesses are created in portions 44 where photoresist on only one side of the metal sheet is unexposed, with corresponding photoresist on the opposite side of the metal sheet being exposed in portions 46. Apertures are created in areas where photoresist on corresponding opposite sides of the metal sheet is unexposed in portions 44. Patterns of apertures in recessed areas are created where relatively large unexposed portions 44 on one side of the metal sheet are aligned with patterns of smaller unexposed portions 44 on the opposite side of the sheet.

The unexposed portions 44, which define the apertures and recesses, are generally substantially wider than adjacent exposed portions 46, preferably being at least twice as wide, to create in the final ornament a delicate lacy effect with needlework qualities. Such may not be the invariable rule, however, given that actual proportions are a function of the particular design employed. The width of any masked area is no less than the thickness of the metal sheet at that point after the etching process. Very fine structural/design elements can nevertheless be created by deeply etching one side of the metal sheet to leave a very thin metal film on the second side, and employing correspondingly narrow masked portions on that other side of the sheet. Etching of the second side then leaves very narrow unetched areas of very thin metal.

In the case of three-dimensional ornaments produced by bending or folding the finally coated ornament, some unexposed areas of photoresist define areas to be recessed along intended lines of folding. These may be located on one or both sides of the metal sheet, as required by the intended folding of the ornament. Such unexposed areas of photoresist are typically narrower than adjacent exposed portions since they are only to lead to recesses along folding lines, and the final ornaments are sturdy at such points.

Figure 5C:
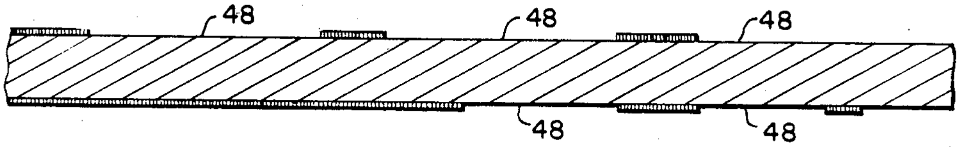
FIG. 5C is a cross-sectional view of the coated and exposed sheet metal of FIG. 5B, after development of the photoresist.

The layers 32 and 34 after exposure are developed to dissolve the portions of the layers that have not been exposed, to leave bare metal 48 in the areas to be etched, as shown in FIG. 5C.

Figure 5D:
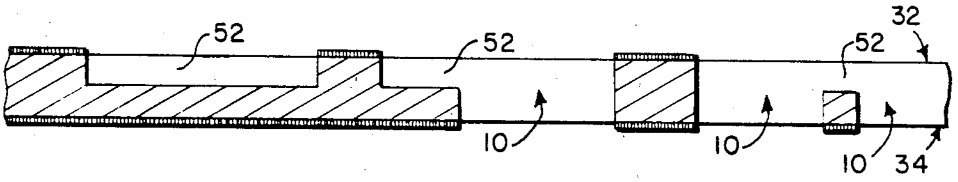
FIG. 5D is a cross-sectional view of the sheet metal of FIG. 5C, after etching from both sides.

As shown in FIG. 5D the two sides 32 and 34 are next etched, either sequentially or simultaneously. The top side 32 of the metal sheet is etched until cavities 52 defining the recessed areas are created but not to the extent of creating apertures 10 in the metal sheet. The bottom side 34 of the metal sheet is etched to the extent that metal between the bottom side and the extent to which the recessed areas of the top side has been etched is removed, thereby creating apertures in the metal sheet only in those areas where the photoresist on both sides of the metal sheet was unexposed.

Figure 5E:
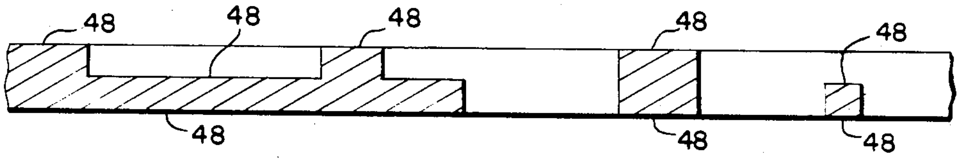
FIG. 5E is a cross-sectional view of the etched metal ornament of FIG. 5D after the residual photoresist has been stripped.

As shown in FIG. 5E, the photoresist from the metal sheet is fully removed to leave bare metal 48.

Figure 5F:
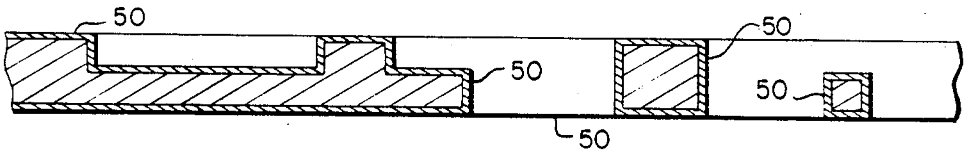
FIG. 5F is a cross sectional view of the ornament of FIG. 5E as preferably coated.

As shown in FIG. 5F the metal sheet may be coated with a thin layer, typically of 0.001 to 0.006 in., of an elastomer-containing paint 50 or a metal plating such as gold, to enhance the final aesthetic appearance of laciness.

Although the etching process is exemplified and claimed in terms of a photoresist which when exposed and developed leaves bare metal for etching, it will be appreciated that an oppositely-functioning photoresist will operate in the invention equally well, with only appropriate photomasks being required.

What is claimed is:

1. A coated apertured sheet metal ornament exhibiting the appearance of lace, comprising:

a metal sheet having a front viewing surface and a rear surface;

said sheet being intricately apertured from surface to surface, to define a lace-like pattern of unapertured areas;

said sheet being intricately etched in further portions through said front surface to depths only partially through said sheet, to create recessed areas in said sheet;

said intricately etched further portions defining unetched portions having dimensions which approximate the dimensions of lace stitching, to enhance the lace-like appearance of said pattern;

said apertures and intricately etched further portions being generally substantially wider than adjacent solid portions of said ornament, for delicacy of appearance;

the width of any solid area adjacent to a recessed area or an aperture in the metal sheet being at least equal to the depth of the adjacent recess or aperture; and a thin layer of coating on said sheet to enhance the lacy decorative appearance.

2. An ornament according to claim 1, wherein recessed areas are approximately at least twice as wide as adjacent unetched portions, and apertures are approximately at least twice as wide as adjacent unapertured areas.

3. An ornament according to claim 1, wherein the coating contains at least one elastomer, enabling said coating to resist cracking as the ornament is bent.

4. The ornament of claim 1 wherein said coating is a metal layer.

5. The ornament of claim 1 further including:

portions of said sheet projecting into an aperture and etched partially through the sheet from the front surface thereof.

6. A coated apertured three-dimensional metal ornament exhibiting the appearance of lace, comprising:

a metal sheet shaped and folded to provide a three-dimensional ornament, the metal sheet having front and rear surfaces, as well as primary and secondary surface portions corresponding to surfaces of the folded sheet respectively open to view and at least partially obscured from view;

said metal sheet being intricately apertured from said front surface to said rear surface to define a lace-like pattern of unapertured areas;

said metal sheet being intricately etched in further portions through at least its primary surface portions to depths only partially through said sheet to create recessed areas in said sheet;

said intricately etched further portions defining unetched portions having dimensions which approximate the dimensions of lace stitching, to enhance the lace-like appearance of said pattern;

said metal sheet being further etched on secondary surface portions of said folded metal sheet along intended lines of folding, to facilitate folding;

said apertures and intricately etched further portions being generally substantially wider than adjacent solid portions of said ornament, for delicacy of appearance;

the width of any solid area adjacent to a recessed area or an aperture in the metal sheet being at least equal to the depth of the adjacent recess or aperture; and a thinly coating on said metal sheet to enhance the fine and lacy decorative appearance.

7. An ornament according to claim 6, wherein recessed areas are approximately at least twice as wide as adjacent nonrecessed areas, and apertures are approximately at least twice as wide as adjacent unapertured areas.

8. An ornament according to claim 6, wherein the coating contains at least one elastomer, enabling said coating to resist cracking as the ornament is bent.

9. An ornament according to claim 6 wherein said coating is a metal layer.

10. An etching process for making metal ornaments having the appearance of lace, comprising the steps of:

applying a layer of photoresist to first and second sides of a metal sheet;

imaging the photoresist on the first side of said metal sheet by exposing it through a first photomask;

imaging the photoresist on the second side of said metal sheet by exposing it through a second photomask complementary to said first photomask and aligned therewith;

said first and second photomasks masking areas of photoresist which define recesses in areas where the corresponding area on the opposite side of the metal sheet is exposed, and apertures in areas where the corresponding area on the opposite side of the metal sheet is unexposed, said recesses and apertures defining structural and design elements of said ornaments, said areas of masking generally being substantially wider than adjacent exposed areas, at least some of the recess-defining masked areas of the first side of said metal sheet being aligned with aperture-defining masked areas of the second side to create patterns of apertures in recessed areas, the width of any exposed area being no less than the thickness of the metal sheet at that point after etching;

developing the photoresist on both sides of the metal sheet to leave bare metal in areas to be etched;

etching unprotected metal areas of the first side of the metal sheet part way through said metal sheet;

etching unprotected metal areas of the second side of the metal sheet to the extent that metal between said second side and the bottom of the etched areas of said first side is removed, thereby creating recessed areas where photoresist on only one side of the metal sheet was unexposed, and apertures only in those areas where the photoresist on both sides of the metal sheet was unexposed;

removing the photoresist from the metal sheet; and coating the metal sheet with a thin layer to enhance the lacy decorative appearance.

11. An ornament according to claim 10, wherein the layer contains at least one elastomer, enabling said layer to resist cracking as the ornament is bent.

12. A process for fabricating a sheet metal ornament having the appearance of lace, comprising the steps of:

applying a layer of photoresist to first and second sides of a metal sheet;

exposing the layer of photoresist on the first side of said metal sheet in a first pattern;

exposing the layer of photoresist on the second side of said metal sheet in a second pattern which cooperates with said first pattern to produce:

opposing areas of unexposed photoresist on each side of said sheet, defining apertures to be etched, opposing areas of exposed photoresist defining structural members of said ornament, and opposing areas of photoresist unexposed on only one side of said first and second sides, defining recesses in said sheet;

exposed areas having widths at least as great as the underlying sheet thickness after etching, and generally substantially less than the width of adjacent unexposed areas;

developing the photoresist on both sides of the metal sheet to leave bare metal in areas to be etched;

etching the sheet in the unprotected metal areas to produce apertures through the aperture-defining areas and recesses in the recess-defining areas, without creating apertures in the recess-defining areas; and coating said etched metal sheet with a thin layer adherent to said sheet, to enhance the lacy decorative appearance thereof.

13. An ornament according to claim 12, wherein the layer contains at least one elastomer, enabling said layer to resist cracking as the ornament is bent.

14. An apertured sheet metal ornament exhibiting the appearance of lace, comprising:

a metal sheet having a front viewing surface and a rear surface;

said sheet being intricately apertured from surface to surface; to define a lace-like pattern of unapertured areas;

said sheet being intricately etched in further portions through said front surface to depths only partially through said sheet, to create recessed areas in said sheet;

said intricately etched further portions defining unetched portions having dimensions which approximate the dimensions of lace stitching, to enhance the lace-like appearance of said pattern;

said apertures and intricately etched further portions being generally substantially wider than adjacent solid portions of said ornament, for delicacy of appearance; and the width of any solid area adjacent to a recessed area or an aperture in the metal sheet being at least equal to the depth of the adjacent recess or aperture.

15. An apertured sheet metal ornament exhibiting the appearance of lace, comprising:

a metal sheet having a front viewing surface and a rear surface;

said sheet being intricately apertured from surface to surface, to define a lace-like pattern of unapertured areas having dimensions approximating the dimensions of lace stitching;

said apertures being generally substantially wider than adjacent solid portions of said ornament, for delicacy of appearance;

the width of any solid area adjacent to an aperture in the metal sheet being at least equal to the depth of the adjacent aperture; and a thinly applied coating on said metal sheet to enhance the lacy appearance of said ornament, said coating being capable of flexing with the ornament as the ornament is flexed.

* * * * *